(12) United States Patent
Young et al.

(10) Patent No.: US 11,868,493 B2
(45) Date of Patent: Jan. 9, 2024

(54) WORK-FROM-HOME AGENT SECURITY COMPLIANCE

(71) Applicant: Avaya Management L.P., Santa Clara, CA (US)

(72) Inventors: John A. Young, Buntingford (GB); Harsh V. Mendiratta, East Brunswick, NJ (US); David Chavez, Broomfield, CO (US)

(73) Assignee: Avaya Management L.P., Santa Clara, CA (US)

( * ) Notice: Subject to any disclaimer, the term of this patent is extended or adjusted under 35 U.S.C. 154(b) by 411 days.

(21) Appl. No.: 17/012,897

(22) Filed: Sep. 4, 2020

(65) Prior Publication Data

US 2022/0075882 A1 Mar. 10, 2022

(51) Int. Cl.

| | |
|---|---|
| *G06F 21/62* | (2013.01) |
| *G10L 25/51* | (2013.01) |
| *H04L 9/40* | (2022.01) |
| *G06F 21/60* | (2013.01) |
| *G06F 3/16* | (2006.01) |
| *G10L 19/00* | (2013.01) |
| *G10L 15/26* | (2006.01) |
| *H04M 3/51* | (2006.01) |

(Continued)

(52) U.S. Cl.
CPC .............. *G06F 21/62* (2013.01); *G06F 3/165* (2013.01); *G06F 18/214* (2023.01); *G06F 21/604* (2013.01); *G06V 20/00* (2022.01); *G10L 15/26* (2013.01); *G10L 19/00* (2013.01); *G10L 25/51* (2013.01); *H04L 63/20* (2013.01); *H04M 3/5175* (2013.01); *H04M 2203/6009* (2013.01)

(58) Field of Classification Search
CPC ........ G06F 21/62; G06F 3/165; G06F 21/604; G06F 3/167; G06F 21/554; G06F 21/57; G06F 21/6245; G06K 9/6256; G06V 20/00; G06V 20/52; G06V 10/82; G10L 15/26; G10L 19/00; G10L 25/51; H04L 63/20; H04L 67/52; H04L 67/535; H04M 3/5175; H04M 2203/6009; H04W 12/02; H04W 12/12; H04W 12/65
USPC .............................................................. 726/1
See application file for complete search history.

(56) References Cited

U.S. PATENT DOCUMENTS

| | | |
|---|---|---|
| 8,401,155 B1 | 3/2013 | Barnes et al. |
| 10,542,423 B1 * | 1/2020 | Chang ................... H04W 12/64 |

(Continued)

OTHER PUBLICATIONS

Clark-Turner et al. 2018 IEEE, 13th ACM International Machine Learning for HRI "Deep Reinforcement Learning of Abstract Reasoning from Demonstrations", pp. 160-168 (Year: 2018).*

*Primary Examiner* — Khalil Naghdali
(74) *Attorney, Agent, or Firm* — Sheridan Ross P.C.

(57) ABSTRACT

Working from home is becoming more and more commonplace. Ensuring that remote workers are following prescribed data protection measures becomes more important, and challenging. Safe and Secure Remote Working Environment (SSRWE) monitors an environment and determines if a non-compliant element is present. For example, a condition of working from home may be that no notetaking or electronic devices, especially ones comprising a camera, be visible to a system camera capturing the field of view in front of a display. If a non-compliant situation is discovered, the display may be redacted and/or other action taken to protect sensitive information.

20 Claims, 6 Drawing Sheets

(51) Int. Cl.
*G06V 20/00* (2022.01)
*G06F 18/214* (2023.01)

(56) References Cited

U.S. PATENT DOCUMENTS

| | | |
|---|---|---|
| 10,580,014 B2 | 3/2020 | Moran et al. |
| 10,728,384 B1* | 7/2020 | Channakeshava .. G06F 21/6245 |
| 2012/0013744 A1* | 1/2012 | Piel ................ G08B 13/19676 |
| | | 348/E7.085 |
| 2015/0040215 A1* | 2/2015 | Blodgett ................ G06F 21/85 |
| | | 726/22 |
| 2020/0226896 A1* | 7/2020 | Robertson .......... G06Q 10/1091 |
| 2020/0242407 A1* | 7/2020 | Gandhi ................ G06V 30/194 |
| 2021/0279527 A1* | 9/2021 | Zadeh ................ G06V 10/945 |
| 2021/0334645 A1* | 10/2021 | Pardeshi ................ G06N 3/08 |

* cited by examiner

WORK-FROM-HOME AGENT SECURITY COMPLIANCE

COPYRIGHT NOTICE

A portion of the disclosure of this patent document contains material that is subject to copyright protection. The copyright owner has not objected to the facsimile reproduction by anyone of the patent document or the patent disclosure as it appears in the Patent and Trademark Office patent files or records, but otherwise reserves all copyright rights whatsoever.

FIELD OF THE DISCLOSURE

The invention relates generally to systems and methods for maintained sensitive information and particularly to detecting a non-compliant environment wherein sensitive data may be at risk and responding accordingly.

BACKGROUND

Contact center agents often need to access a customer's sensitive information, such as personally identifiable information (PII). PII might include a social security number, a credit card number, a date of birth, medical records, bank records, etc. Agents have been known to take PPI for their own use or to sell to other nefarious actors.

In the office environment, companies can easily enforce security rules, like requiring agents to keep a clean desk, especially when they leave their shift, not allowing screen shots and/or other types of recordings, no notes on any paper/digital pads, etc. In many cases, a supervisor may be able to spot any non-compliance simply by walking around and observing the environment. When agents are working remotely, and particularly from home, the same security measures cannot be observed nor enforced.

SUMMARY

These and other needs are addressed by the various embodiments and configurations of the present invention. The present invention can provide a number of advantages depending on the particular configuration. These and other advantages will be apparent from the disclosure of the invention(s) contained herein.

When an agent is working remotely, embodiments described herein, collectively known as Safe and Secure Remote Working Environment (SSRWE) are disclosed to better monitor and enforce office-based security practices while the agent is working remotely, in particular, from home.

In one embodiment, a SSRWE application utilizes a camera and/or microphone in or attached to an agent's personal computer or other device (e.g., smart phone, tablet, etc.). The application continuously monitors, analyzes, and evaluates the working environment for compliance with the company's rules. Any nonconformity will be reported and/or lead to immediate actions including but not limited to supervisor barge-in, disablement of agent's account, pop-up messages, screen changes, etc. The agent will not be permitted to disable this application and/or capturing instrument. Any such attempt may lead to immediate action, such as temporary or permanent account suspension.

An administrator or other authorized user may determine what is or is not acceptable for the agent's environment in order to comply with a particular company's security policies. Examples of security policies may include, but are not limited to having a clutter-free desk space; a prohibition on taking notes on notepad or digital media; no capturing information from a display screen using camera and/or any other means; absence of other individuals (e.g., friends or family members next to the agent while working); and a current location that is not considered insecure (e.g., coffee shop, airport lounge, etc.) or at a previously determined acceptable location.

In another embodiment, an artificial intelligence (AI) model, such as a neural network, is trained and utilized to support the SSRWE application. Training may include a training dataset comprised of multiple still and/or video images that depict unacceptable and acceptable remote agent working conditions (e.g., variations of cluttered desks and tidy desks, sample public work spaces and home offices, the presence of more than one individual within the camera's field of view, the presence of a camera phone pointed at the agent screen, examples of the agent taking manual notes while speaking with a caller). The training process may incorporate explicit human feedback indicating correct or incorrect determinations made by the AI system.

In another embodiment, agents may be asked to intentionally violate security practices, such as during a supervised training mode (with no sensitive information being presented) in order to provide the AI subsystem with images for training that are known to violate security requirements—and optionally as a means to educate the agent on unacceptable behaviors. For example, an agent may be asked to write down information in order to train the AI system what note taking will look like for this particular agent. Similarly, contraband (e.g., cell phone, camera, etc.) may be placed in the field of view of the camera to produce another set of images for training the AI system. While generic images may be utilized (e.g., It should also be possible to detect and correlate whether an agent is manually taking notes while in conversation with an active customer who is sharing personal data. During a supervised enrollment stage, each agent will be requested to present themselves to the SSRWE application from his or her own specific remote working environment. Aside from presenting a baseline tidy workplace, the agent can also be requested to depict some specific examples of unacceptable remote working practices (e.g., taking manual written notes, including additional people within camera view, etc.) a source of more accurate training baseline for individual agents.

In one embodiment, a system is disclosed, comprising: a network interface to a network; a processor configured with machine-readable instructions maintained in a non-transitory storage; a camera; a display presenting information a user of the system, wherein the information comprises sensitive information; receiving a camera image from the camera and determining whether the camera image comprises an image of a non-compliant environment; and upon determining that the camera image does comprise the image of the non-compliant environment, executing a non-compliance response, comprising omitting presentation of the sensitive information by the display.

In another embodiment, a method is disclosed, comprising: presenting information on a display of a system, wherein the information comprises sensitive information; receiving a camera image from a camera; determining whether the camera image comprises an image of a non-compliant environment; and upon determining that the camera image does comprise the image of the non-compliant environment, executing a non-compliance response, comprising omitting presentation of the sensitive information by the display.

In another embodiment, a computer-implemented method of training a neural network for non-compliant environment detection of a remote work environment is disclosed, comprising: access a set of object images that indicate a non-compliant environment; applying one or more transformations to the set of object images including, rotating, color-altering, position translation, contrast alteration, or brightness alteration to create a modified set of object images; creating a first training set comprising the collected set of object images, the modified set of object images, and a set of compliant environment images; training the neural network in a first stage using the first training set; creating a second training set for a second stage of training comprising the first training set and the set of compliant environment images that are incorrectly detected as object images that indicate the non-compliant environment in the first stage of training; and training the neural network in a second stage using the second training set.

The phrases "at least one," "one or more," "or," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B, and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible, non-transitory medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below. Also, while the disclosure is presented in terms of exemplary embodiments, it should be appreciated that an individual aspect of the disclosure can be separately claimed.

BRIEF DESCRIPTION OF THE DRAWINGS

The present disclosure is described in conjunction with the appended figures.

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising a numeric reference number, without an alphabetic sub-reference identifier when a sub-reference identifier exists in the figures, when used in the plural, is a reference to any two or more elements with a like reference number. When such a reference is made in the singular form, but without identification of the sub-reference identifier, is a reference one of the like numbered elements, but without limitation as to the particular one of the elements. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices, which may be omitted from or shown in a simplified form in the figures or otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
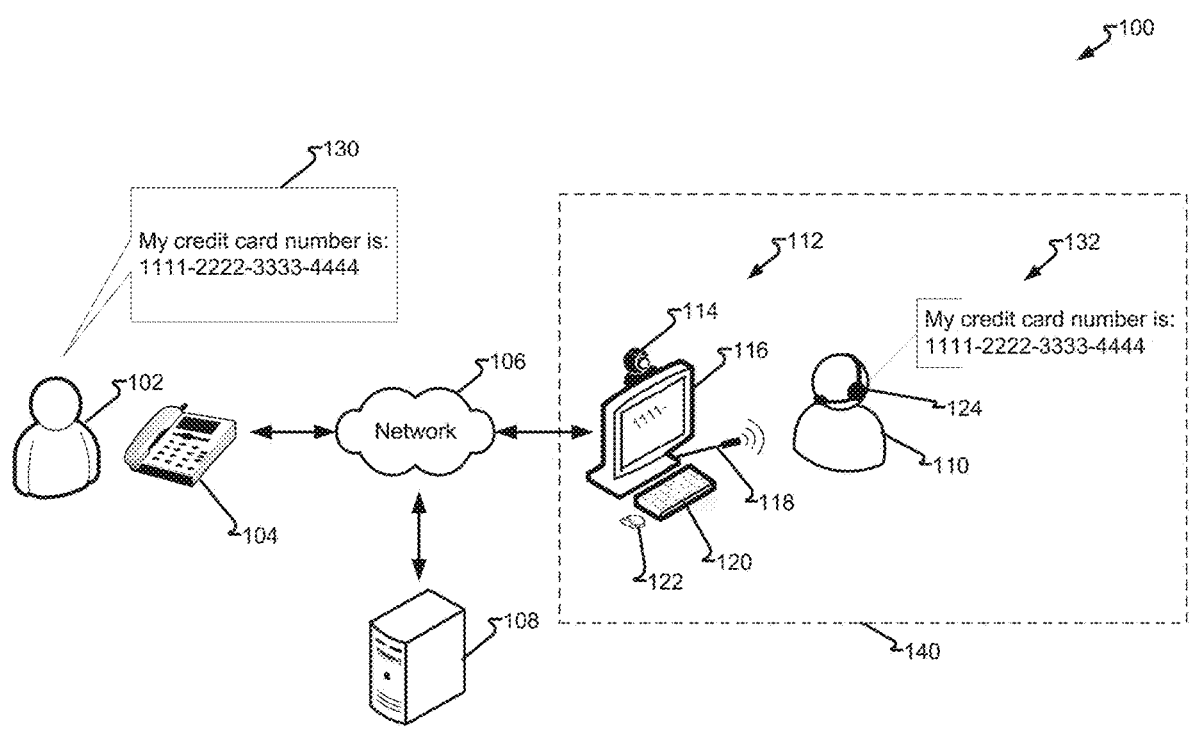
FIG. 1 depicts a first system in accordance with embodiments of the present disclosure.

FIG. 1 depicts system 100 in accordance with embodiments of the present disclosure. In one embodiment, user 110 utilizes user device 112 to process data, which may include sensitive information (e.g., any information that, if revealed to an unauthorized party, could result in an unintended loss of privacy, money, or other resource; enable an unauthorized party to access data, device, or a service; impersonate an authorized party; and/or other nefarious act). For example, customer 102 may be performing a transaction and providing sensitive information 130 (e.g., a credit card number) to user device 112 for presentation to user 110 such as via headset 124 as decoded speech 132. User 110 may then enter the sensitive information into user device 112, such as via keyboard 120, mouse 122, microphone 118, and/or other input device. As a result, display 116 may display the confidential information.

In a controlled environment, such as a contact center, a company, such as an employer of user 110 has control over the physical space comprising user 110 and user device 112, such as by restricting access to the premises to only employees and authorized parties, monitoring the actions of users, and monitoring the users' workspace. However, when user 110 and user device 112 are located elsewhere, such as the home of user 110, managing the physical requires different systems and strategies.

In one embodiment, user 110 may access sensitive information from customer 102, via customer communication device 104 in communication with user device 112 utilizing network 106. In another embodiment, user 110 may access sensitive information from another source, such as server 108 having access to data maintained in a data storage. For example, user 110 may perform "batch" processing where information is obtained for data entry and/or processing, such as from a previously submitted form, text message, email, recorded audio message, or other data source (collectively, server 108) or, as illustrated, user 110 may obtain information from a real-time communication with customer 102. Therefore, while user 110 may be an "agent" (e.g., customer service agent, sales agent, technical support agent, etc.), non-agent users (e.g., users performing data entry from paper, users performing data entry from media or content presented by user device 112, data processing, etc.) are also contemplated, therefore the term "agent" and the term "user" may be used interchangeable to refer to any human presented with information, which may comprise sensitive information, by and/or for entry to user device 112.

In another embodiment, user device 112 comprises and/or utilizes camera 114 having a field of view comprising at least a portion of user 110 and a portion of the environment 140 of user 110, which may include all or a portion of a desk surface, chair, wall/background, any permitted objects (e.g., mouse 122, keyboard 120, permitted work or reference materials, etc.), and any contraband objects (things or people) or actions (e.g., unauthorized note taking).

If a processor, such as a processor or user device 112, server 108, and/or other computing device(s) determines that environment 140 is non-compliant, a non-compliant response (i.e., a response to the determination that environment 140 is not in compliance with a prescribed environmental state) is performed. The non-compliant response may be to block sensitive information from being overseen by another party, disabling a display completely, terminating an audio, disabling an account of user 110, notifying/connecting a supervisor or other personnel, disabling and/or wiping user device 112, and/or other action so that sensitive information presented by user device 112 may be protected.

While user device 112 may comprise headset 124 (e.g., a wearable microphone and/or speaker), user device 112 may utilize other speakers for the presentation of audio information. While user 110 may speak and have the speech detected and converted into electrical signals by a microphone of headset 124, other microphones, such as microphone 118 may be utilized to capture the speech provided by user 110 and/or environmental sounds. Environmental sounds may be evaluated for sound portions associated with a non-compliant environment. For example, sounds of a public space (e.g., café, airport, etc.), presence of non-authorized personnel (e.g., family members speaking), suspicious activity (e.g., user 110 speaking sensitive information unnecessarily), etc.

User device 112 may comprise other sensing components, such as an accelerometer to determine if or how user device 112 is moved, such as when user device 112 is a laptop or other portable device. A location sensing component (e.g., GPS receiver and processor). Accordingly, if user device 112 is moved or otherwise relocated against security policy, a non-compliant environment may be concluded therefrom. Optionally, microphone 118 (or a microphone of headset 124) may be utilized to determine whether environment 140 is a non-compliant environment (e.g., hearing coffee orders, hearing another party talking, etc.).

Figure 2:
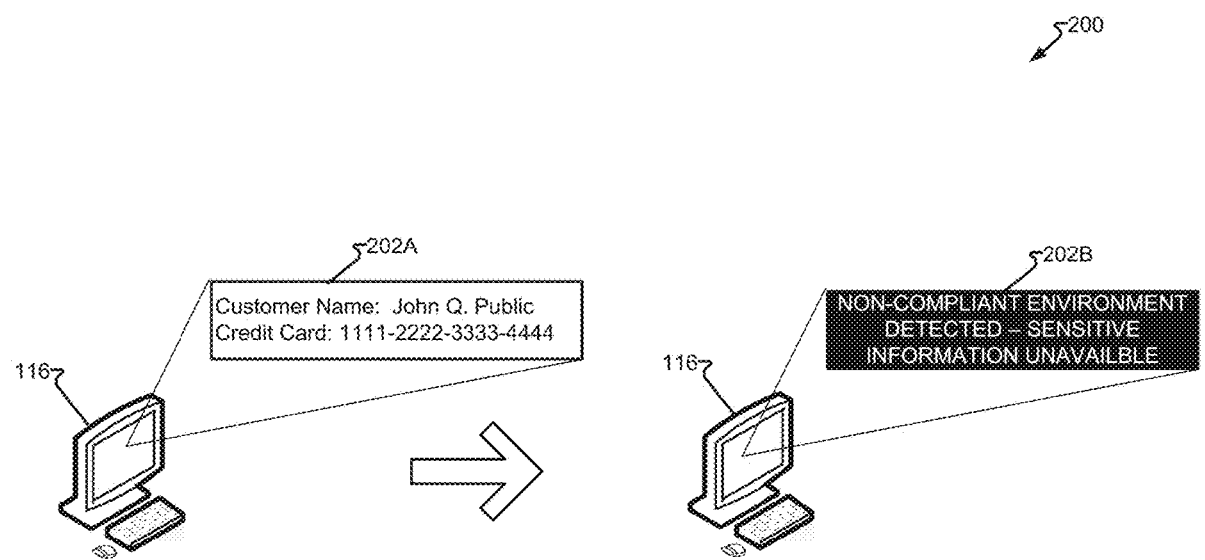
FIG. 2 depicts a non-compliant response in accordance with embodiments of the present disclosure.

FIG. 2 depicts non-compliant response 200 in accordance with embodiments of the present disclosure. When environment 140 is determined to be a non-compliant environment, a non-compliance response is performed, such as when display 116 is presenting content 202A and, in response to the non-compliance, presents content 202B in place of content 202A.

In another embodiment, when user 110 is presently engaged in a real-time communication with customer 102, a message may be generated and sent to customer communication device 104, such as to notify customer 102 that user 110 has became unavailable and they will be connected to a different agent as soon as possible. In another embodiment, server 108 may receive a notification of the non-compliance and, in response, notify or automatically connect a supervisor communication device to user device 112 to enable a communication between the supervisor and user 110.

In another embodiment, user device 112 may be "wiped" in response to the non-compliant environment comprising one or more of, purging at least a portion of all volatile memory of user device 112, deleting and/or overwriting at least a portion of the data stored on storage media, initiating a "phone home" message to notify a security component of the location of user device 112, and/or other action. Additionally or alternatively, user device 112 may be locked wherein only a limited set of functions are enabled (e.g., communicate with a supervisor), such as to reset user device 112 to re-enable the presentation of sensitive information and/or recover from a mistakenly identified non-compliant environment determination. For example, a supervisor may be able to view a current and/or captured image of environment 140 and override a machine-based determination that environment 140 is non-compliant. As a further option, the error may be provided back to the AI system to avoid a similar erroneous determination in the future.

Figure 3:
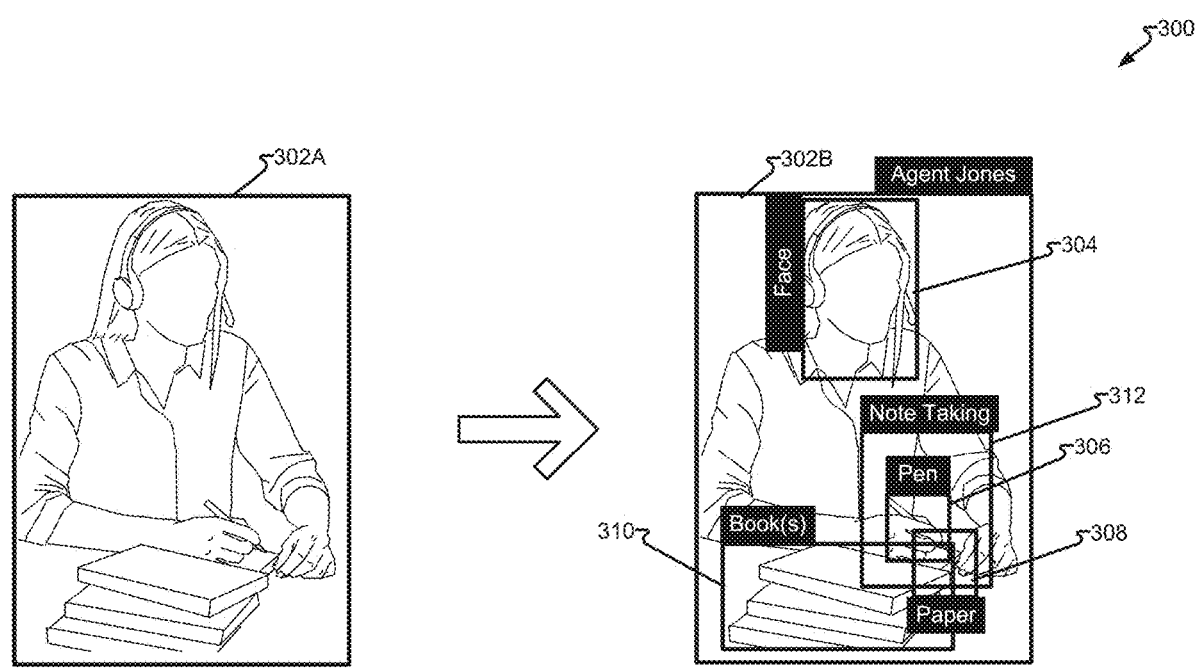
FIG. 3 depicts a capturing and processing of an image in accordance with embodiments of the present disclosure.

FIG. 3 depicts capturing and processing 300 of an image in accordance with embodiments of the present disclosure. In one embodiment, camera 114 captures image 302A. A processor, of or accessible to user device 112, analyzes image 302A to determine whether a non-compliant environment is present. Image 302A may be processed with machine-vision to determine object images that are captured within frame 302B. For example, frame 302B may identify a person (e.g., face 304) or people therein (e.g., authorized agent versus any non-authorized person), objects such as pen 306, paper 308, and books 310. If compliance requires a clean workspace, the presence of any unauthorized object (e.g., pen 306, paper 308, books 310, etc.) will be determined to be a non-compliant environment. Similarly, the presence of any image or sound capturing device (e.g., camera, smart phone, electronic tablet, etc.) may be prohibited and indicate a non-compliant environment. Should another person (e.g., friend, family member, etc.) enter the frame, the presence of an additional party or of any unauthorized party, would be determined as a non-compliant environment.

In another embodiment, motion or actions may be identified, such as note taking 312. Here to, if such an action is unauthorized, a processor may determine that such an action is a non-compliant environment.

In yet another embodiment, bypassing or any attempt to thwart the system, such as disconnecting the camera, covering the camera, pointing the camera away from a target (e.g., environment 140, user 110, etc.), disabling a required application, etc., may be determined to be a non-compliant environment and a response thereto initiated. Similarly, if a processor, such as one executing an AI system, cannot determine what an object is within environment 140, a default action, such as a determination of non-compliance, may be executed. If the unidentified object is later determined to be acceptable, such as by a supervisor's override (see above), then the object image may be provided back to the AI system as a training image for acceptable object images.

Figure 4:
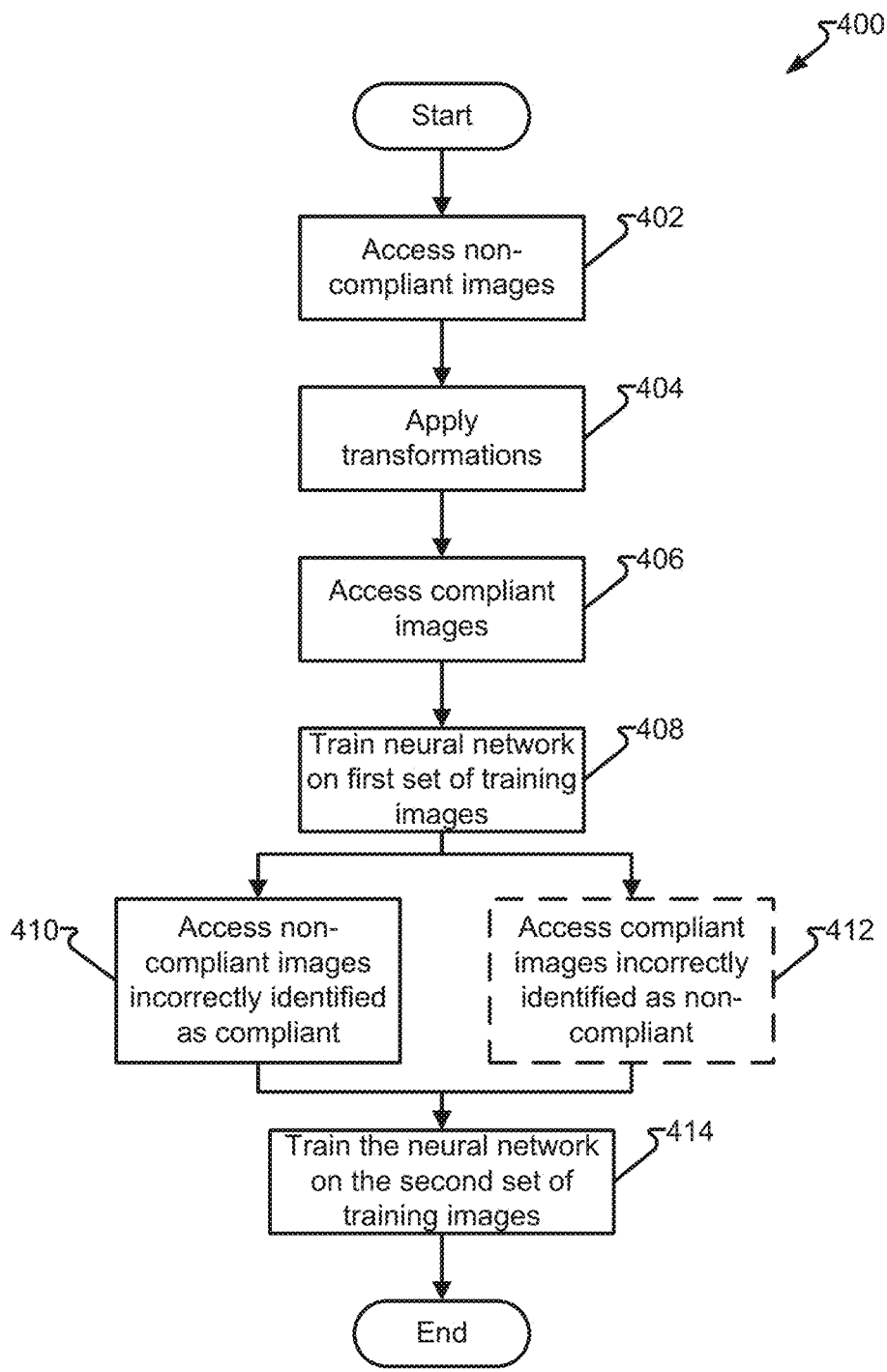
FIG. 4 depicts a first process in accordance with embodiments of the present disclosure.

FIG. 4 depicts process 400 in accordance with embodiments of the present disclosure. Process 400 may be embodied as a set of machine-readable instructions to cause a processor, such as a processor of user device 112, server 108, and/or other computing device, to perform the steps of process 400. In one embodiment, process 400 illustrates one set of steps for the training of a neural network. As an exact match to a previously determined compliant or non-compliant environment is unlikely to be produced, a substantial match of environment 140 to a corpus or model of a particular environment is provided, such as via evaluation by a trained neural network.

A neural network is provided, such as one or more processes embodied as machine-readable instructions maintained in a non-transitory memory and executed by a processor(s) of user device 112, server 108, and/or other processing device(s) in communication with user device 112. The neural network, as is known in the art and in one embodiment, self-configures layers of logical nodes having an input and an output. If an output is below a self-determined threshold level, the output is omitted (i.e., the inputs are within the inactive response portion of a scale and provide no output), if the self-determined threshold level is above the threshold, an output is provided (i.e., the inputs are within the active response portion of a scale and provide an output), the particular placement of the active and inactive delineation is provided as a training step or steps. Multiple inputs into a node produce a multi-dimensional plane (e.g., hyperplane) to delineate a combination of inputs that are active or inactive.

By way of example, a first layer of nodes may evaluate an image for edges, where an edge is detected, the nodes provide an input to a next layer of nodes. The next layer of nodes may look for textures such as to delineate a wall from a body part. Again, the nodes that find a target texture are active and provide an input to a next layer of nodes which may then look for particular shapes or other features. The process continues until a conclusion is reached that a particular object or action is, or is not, provided within an image(s). As a further embodiment, a particular action may be determined (e.g., taking a picture of display 116 with a cell phone, note taking, etc.).

In one embodiment, step 402 accesses a set of non-compliant images or portions thereof associated with a non-compliant environment. For example, if note taking was considered non-compliant, images comprising writing instruments and paper or an electronic tablet or other device, would be utilized. Step 404 would apply one or more transformations to derive a set of modified images, such as by rotating, translating (moving), partially obscuring, change contrast, change color, change pattern. Step 406 accesses a set of compliant images, such as environment 140 that have previously been determined to be compliant. The images accessed in step 406 may comprise acceptable objects (e.g., user 110, keyboard 120, mouse 122, etc.). If compliance requires a clean work surface than any object, or at least any object not already determined to be acceptable, may be considered contraband when on a work surface. Step 406 may utilize stock images (e.g., a pool of images of contraband objects, such as phones having a camera) and/or objects specific to user 110 (e.g., a user's particular phone).

Next, step 408 trains the neural network with the first set of training data comprising, non-compliant images accessed in step 402, transformed non-compliant images accessed in step 404, and compliant images accessed in step 406. Next, steps 410 and/or optionally step 412 are executed to further train the neural network.

Step 410 accesses non-compliant images incorrectly identified as compliant from the step 408. It should be appreciated that the neural network may be trained to identify non-compliant images of an environment and/or compliant images of an environment. For example, step 402 may be performed with compliant images (e.g., keyboard 120, mouse 122, user 110, and/or any other compliant objects), step 404 modifies then provides a set of modified compliant images, step 406 then accesses non-compliant images. Step 408 then performs the first training to have the neural network identify compliant images and, step 412 executed to access object images incorrectly identified as non-compliant.

The results from step 410 (and/or step 412) are then utilized to train the neural network in a second training stage in step 414. As a result, the neural network self-configures and learns to exclude false positive results from the first training set. Subsequent training is also contemplated. For example, a supervisor may be provided with an image of environment 140 and manually examine the image for contraband objects or actions. If any are identified, the object/action may be highlighted and provided to the neural network for subsequent refining of non-compliant environments. Similarly, if the neural network determines that an object is contraband, such as user 110 is wearing a new watch or bracelet identified as a smart watch (e.g., an object capable of capturing images and/or sound), but the object is absent such capability, a supervisor being notified of the (incorrect) non-compliant environment, may similarly highlight the object and identify it as compliant. User 110 may be prompted to show the object to the camera to collect a series of views to be utilized for subsequent training.

In another embodiment, process 400 is executed with sound portions in stead of or in addition to images. For example, step 402 accesses non-compliant sounds (e.g., sounds of public spaces, voices from non-authorized personnel, etc.). Step 404 applies transformations, such as to volume, pitch, pace, etc., Step 406 accesses compliant sounds (e.g., expected, normal, or otherwise compliant sounds). Step 408 trains the neural network on a first set of training sounds. Step 410 accesses non-compliant sounds incorrectly identified as compliant. Optional step 412 access compliant sounds incorrectly identified as non-compliant. Step 414 trains the neural network on the second set of training sounds.

Figure 5:
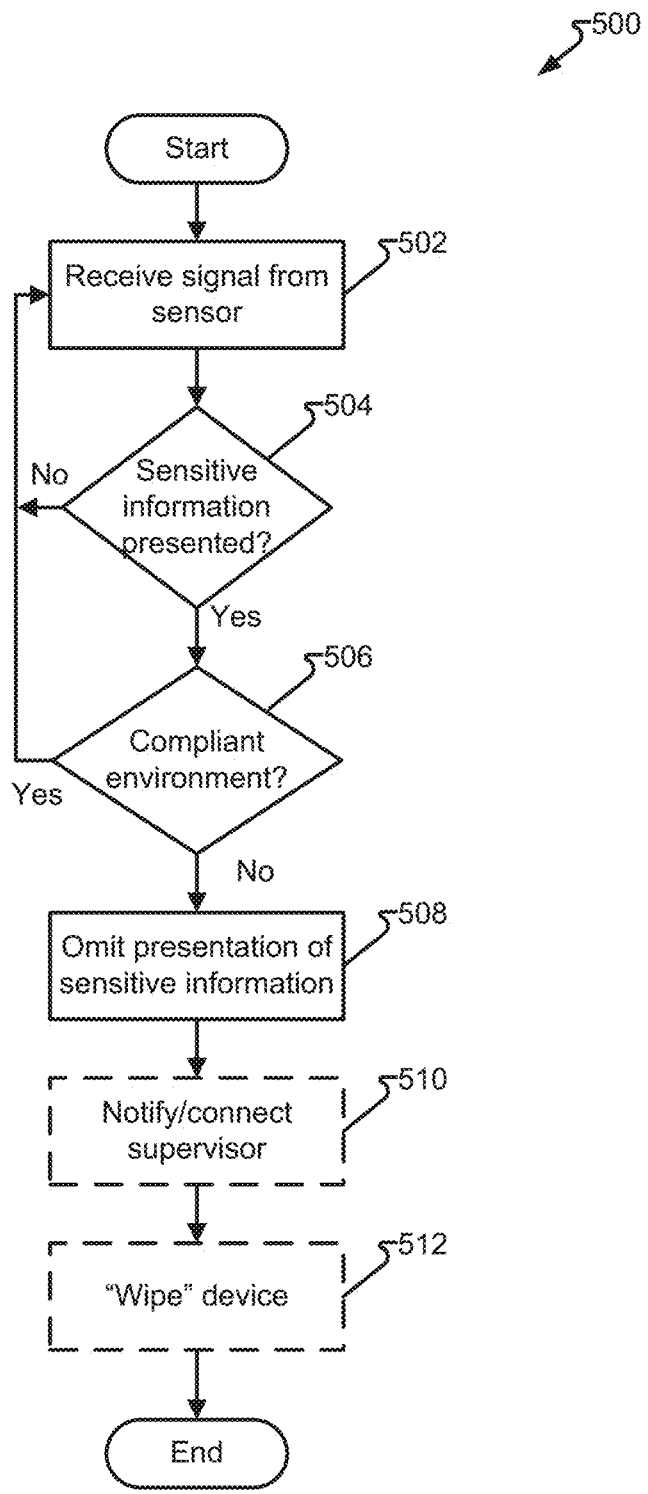
FIG. 5 depicts a second process in accordance with embodiments of the present disclosure.

FIG. 5 depicts process 500 in accordance with embodiments of the present disclosure. Process 500 may be embodied as a set of machine-readable instructions to cause a processor, such as a processor of user device 112, server 108, and/or other computing device, to perform the steps of process 500. Process 500 begins and step 502 receives a signal(s) from a sensor(s) (e.g., camera 114, microphone 118, GPS sensor, accelerometer, etc.). Test 504 determines if sensitive information is being presented, such as by display 116 and/or a speaker (e.g., such as a speaker of headset 124 or other speaker). If test 504 is determined in the negative process 500 may end or loop back to step 502 to continue receiving the sensor(s) signal(s). If test 504 is determined in the affirmative, test 506 determines if environment 140 is complaint, such as by providing a captured still and/or video image of environment 140 to a neural network (see, FIG. 4).

If test 506 is determined in the affirmative (i.e., compliant), processing may loop back to step 502. If test 506 is determined in the negative (i.e., non-compliant) a non-compliance response is initiated, such as omitting the presentation of sensitive information in step 508.

Step 508 may block a portion of display 116 (see, FIG. 2) or an entire display to cause user device 112 to no longer present sensitive information. Additionally or alternatively, step 510 may notify a supervisor and/or automatically connect to a supervisor's communication device, such as to present the image captured by camera 114. The supervisor may then initiate an action, such as to override the determination that some portion of the image is non-compliant, take over a communication with customer 102, suspend/terminate user device 112 from further work or further work that may comprise sensitive information, or other action. Step 512 may be implemented to 'wipe' a device, comprising one or more of purging memory, erasing/overwriting data on a data storage media, disabling communication ability, locking the device, encrypting the device, shutting down the device, and/or other action.

When user device 112 is currently communicating with customer communication device 104 and any one or more of steps 508, 510, and/or 512 are performed, the communication may be transferred to another agent or supervisor. A message may be provided by user device 112 and/or server 108 to customer communication device 104 to notify customer 102 that user 110 has became unavailable and they will be connected to another agent as soon as possible.

Figure 6:
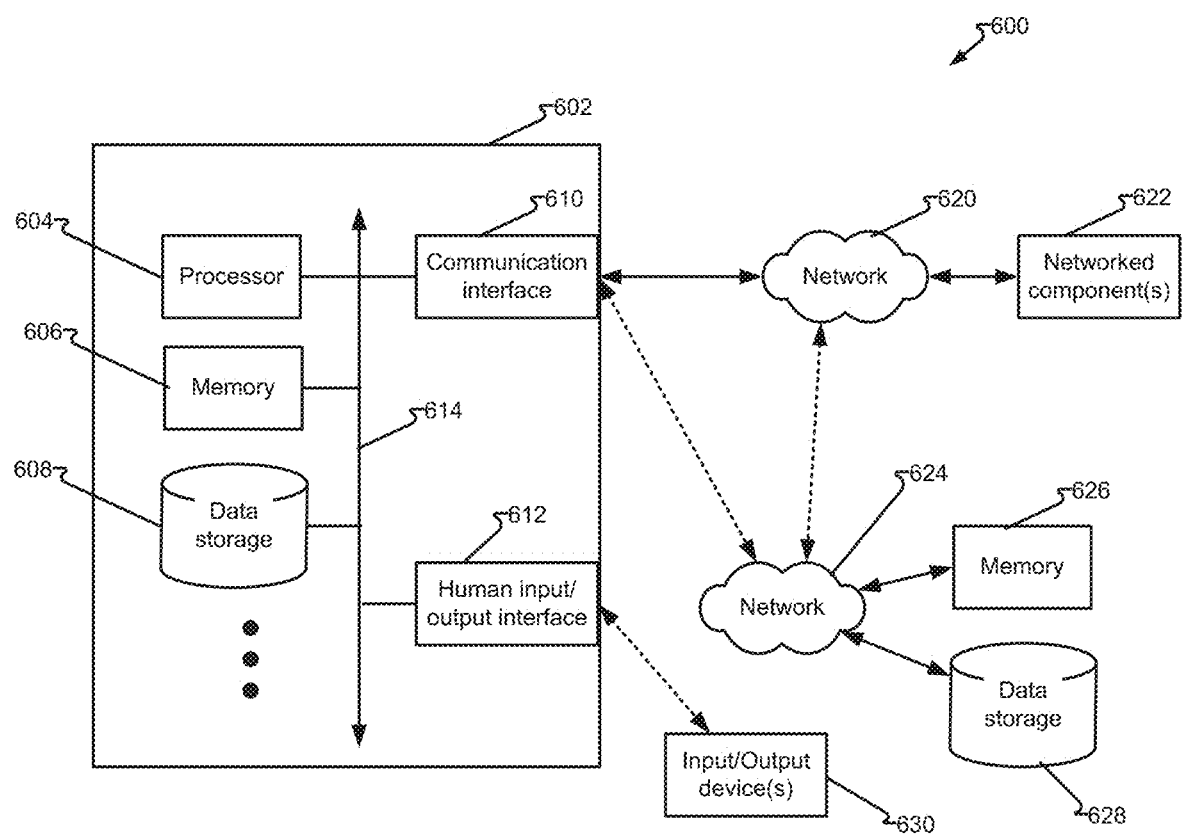
FIG. 6 depicts a second system in accordance with embodiments of the present disclosure.

FIG. 6 depicts system 600 in accordance with embodiments of the present disclosure. In one embodiment, user device 112 may be embodied, in whole or in part, as device 602 comprising various components and connections to other components and/or systems. The components are variously embodied and may comprise processor 604. Processor 604 may be embodied as a single electronic microprocessor or multiprocessor device (e.g., multicore) having therein components such as control unit(s), input/output unit(s), arithmetic logic unit(s), register(s), primary memory, and/or other components that access information (e.g., data, instructions, etc.), such as received via bus 614, executes instructions, and outputs data, again such as via bus 614. In other embodiments, processor 604 may comprise a shared processing device that may be utilized by other processes and/or process owners, such as in a processing array or distributed processing system (e.g., "cloud", farm, etc.). It should be appreciated that processor 604 is a non-transitory computing device (e.g., electronic machine comprising circuitry and connections to communicate with other components and devices). Processor 604 may operate a virtual processor, such as to process machine instructions not native to the processor (e.g., translate the Intel® 9xx chipset code to emulate a different processor's chipset or a non-native operating system, such as a VAX operating system on a Mac), however, such virtual processors are applications executed by the underlying processor (e.g., processor 604) and the hardware and other circuitry thereof.

In addition to the components of processor 604, device 602 may utilize memory 606 and/or data storage 608 for the storage of accessible data, such as instructions, values, etc. Communication interface 610 facilitates communication with components, such as processor 604 via bus 614 with components not accessible via bus 614. Communication interface 610 may be embodied as a network port, card, cable, or other configured hardware device. Additionally or alternatively, human input/output interface 612 connects to one or more interface components to receive and/or present information (e.g., instructions, data, values, etc.) to and/or from a human and/or electronic device. Examples of input/output devices 630 that may be connected to input/output interface include, but are not limited to, keyboard, mouse, trackball, printers, displays, sensor, switch, relay, etc. In another embodiment, communication interface 610 may comprise, or be comprised by, human input/output interface 612. Communication interface 610 may be configured to communicate directly with a networked component or utilize one or more networks, such as network 620 and/or network 624.

Network 106 may be embodied, in whole or in part, as network 620. Network 620 may be a wired network (e.g., Ethernet), wireless (e.g., WiFi, Bluetooth, cellular, etc.) network, or combination thereof and enable device 602 to communicate with network component(s) 622. In other embodiments, network 620 may be embodied, in whole or in part, as a telephony network (e.g., public switched telephone network (PSTN), private branch exchange (PBX), cellular telephony network, etc.)

Additionally or alternatively, one or more other networks may be utilized. For example, network 624 may represent a second network, which may facilitate communication with components utilized by device 602. For example, network 624 may be an internal network to a business entity or other organization whereby components are trusted (or at least more so) that networked components 622, which may be connected to network 620 comprising a public network (e.g., Internet) that may not be as trusted.

Components attached to network 624 may include memory 626, data storage 628, input/output device(s) 630, and/or other components that may be accessible to processor 604. For example, memory 626 and/or data storage 628 may supplement or supplant memory 606 and/or data storage 608 entirely or for a particular task or purpose. For example, memory 626 and/or data storage 628 may be an external data repository (e.g., server farm, array, "cloud," etc.) and allow device 602, and/or other devices, to access data thereon. Similarly, input/output device(s) 630 may be accessed by processor 604 via human input/output interface 612 and/or via communication interface 610 either directly, via network 624, via network 620 alone (not shown), or via networks 624 and 620. Each of memory 606, data storage 608, memory 626, data storage 628 comprise a non-transitory data storage comprising a data storage device.

It should be appreciated that computer readable data may be sent, received, stored, processed, and presented by a variety of components. It should also be appreciated that components illustrated may control other components, whether illustrated herein or otherwise. For example, one input/output device 630 may be a router, switch, port, or other communication component such that a particular output of processor 604 enables (or disables) input/output device 630, which may be associated with network 620 and/or network 624, to allow (or disallow) communications between two or more nodes on network 620 and/or network 624. For example, a connection between one particular customer, using a particular customer communication device 104, may be enabled (or disabled) with a particular networked component 622. Ones of ordinary skill in the art will appreciate that other communication equipment may be utilized, in addition or as an alternative, to those described herein without departing from the scope of the embodiments.

In the foregoing description, for the purposes of illustration, methods were described in a particular order. It should be appreciated that in alternate embodiments, the methods may be performed in a different order than that described without departing from the scope of the embodiments. It should also be appreciated that the methods described above may be performed as algorithms executed by hardware components (e.g., circuitry) purpose-built to carry out one or more algorithms or portions thereof described herein. In another embodiment, the hardware component may comprise a general-purpose microprocessor (e.g., CPU, GPU) that is first converted to a special-purpose microprocessor. The special-purpose microprocessor then having had loaded therein encoded signals causing the, now special-purpose, microprocessor to maintain machine-readable instructions to enable the microprocessor to read and execute the machine-readable set of instructions derived from the algorithms and/or other instructions described herein. The machine-readable instructions utilized to execute the algorithm(s), or portions thereof, are not unlimited but utilize a finite set of instructions known to the microprocessor. The machine-readable instructions may be encoded in the microprocessor as signals or values in signal-producing components and included, in one or more embodiments, voltages in memory circuits, configuration of switching circuits, and/or by selective use of particular logic gate circuits. Additionally or alternative, the machine-readable instructions may be accessible to the microprocessor and encoded in a media or device as magnetic fields, voltage values, charge values, reflective/non-reflective portions, and/or physical indicia.

In another embodiment, the microprocessor further comprises one or more of a single microprocessor, a multi-core processor, a plurality of microprocessors, a distributed processing system (e.g., array(s), blade(s), server farm(s), "cloud", multi-purpose processor array(s), cluster(s), etc.) and/or may be co-located with a microprocessor performing other processing operations. Any one or more microprocessor may be integrated into a single processing appliance (e.g., computer, server, blade, etc.) or located entirely or in part in a discrete component connected via a communications link (e.g., bus, network, backplane, etc. or a plurality thereof).

Examples of general-purpose microprocessors may comprise, a central processing unit (CPU) with data values encoded in an instruction register (or other circuitry maintaining instructions) or data values comprising memory locations, which in turn comprise values utilized as instructions. The memory locations may further comprise a memory location that is external to the CPU. Such CPU-external components may be embodied as one or more of a field-programmable gate array (FPGA), read-only memory (ROM), programmable read-only memory (PROM), erasable programmable read-only memory (EPROM), random access memory (RAM), bus-accessible storage, network-accessible storage, etc.

These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

In another embodiment, a microprocessor may be a system or collection of processing hardware components, such as a microprocessor on a client device and a microprocessor on a server, a collection of devices with their respective microprocessor, or a shared or remote processing service (e.g., "cloud" based microprocessor). A system of microprocessors may comprise task-specific allocation of processing tasks and/or shared or distributed processing tasks. In yet another embodiment, a microprocessor may execute software to provide the services to emulate a different microprocessor or microprocessors. As a result, first microprocessor, comprised of a first set of hardware components, may virtually provide the services of a second microprocessor whereby the hardware associated with the first microprocessor may operate using an instruction set associated with the second microprocessor.

While machine-executable instructions may be stored and executed locally to a particular machine (e.g., personal computer, mobile computing device, laptop, etc.), it should be appreciated that the storage of data and/or instructions and/or the execution of at least a portion of the instructions may be provided via connectivity to a remote data storage and/or processing device or collection of devices, commonly known as "the cloud," but may include a public, private, dedicated, shared and/or other service bureau, computing service, and/or "server farm."

Examples of the microprocessors as described herein may include, but are not limited to, at least one of Qualcomm® Snapdragon® 800 and 801, Qualcomm® Snapdragon® 610 and 615 with 4G LTE Integration and 64-bit computing, Apple® A7 microprocessor with 64-bit architecture, Apple® M7 motion comicroprocessors, Samsung® Exynos® series, the Intel® Core™ family of microprocessors, the Intel® Xeon® family of microprocessors, the Intel® Atom™ family of microprocessors, the Intel Itanium® family of microprocessors, Intel® Core® i5-4670K and i7-4770K 22 nm Haswell, Intel® Core® i5-3570K 22 nm Ivy Bridge, the AMD® FX™ family of microprocessors, AMD® FX-4300, FX-6300, and FX-8350 32 nm Vishera, AMD® Kaveri microprocessors, Texas Instruments® Jacinto C6000™ automotive infotainment microprocessors, Texas Instruments® OMAP™ automotive-grade mobile microprocessors, ARM® Cortex™-M microprocessors, ARM® Cortex-A and ARM1926EJ-S™ microprocessors, other industry-equivalent microprocessors, and may perform computational functions using any known or future-developed standard, instruction set, libraries, and/or architecture.

Any of the steps, functions, and operations discussed herein can be performed continuously and automatically.

The exemplary systems and methods of this invention have been described in relation to communications systems and components and methods for monitoring, enhancing, and embellishing communications and messages. However, to avoid unnecessarily obscuring the present invention, the preceding description omits a number of known structures and devices. This omission is not to be construed as a limitation of the scope of the claimed invention. Specific details are set forth to provide an understanding of the present invention. It should, however, be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components or portions thereof (e.g., microprocessors, memory/storage, interfaces, etc.) of the system can be combined into one or more devices, such as a server, servers, computer, computing device, terminal, "cloud" or other distributed processing, or collocated on a particular node of a distributed network, such as an analog and/or digital telecommunications network, a packet-switched network, or a circuit-switched network. In another embodiment, the components may be physical or logically distributed across a plurality of components (e.g., a microprocessor may comprise a first microprocessor on one component and a second microprocessor on another component, each performing a portion of a shared task and/or an allocated task). It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

In yet another embodiment, the systems and methods of this invention can be implemented in conjunction with a special purpose computer, a programmed microprocessor or microcontroller and peripheral integrated circuit element(s), an ASIC or other integrated circuit, a digital signal microprocessor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include microprocessors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein as provided by one or more processing components.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Embodiments herein comprising software are executed, or stored for subsequent execution, by one or more microprocessors and are executed as executable code. The executable code being selected to execute instructions that comprise the particular embodiment. The instructions executed being a constrained set of instructions selected from the discrete set of native instructions understood by the microprocessor and, prior to execution, committed to microprocessor-accessible memory. In another embodiment, human-readable "source code" software, prior to execution by the one or more microprocessors, is first converted to system software to comprise a platform (e.g., computer, microprocessor, database, etc.) specific set of instructions selected from the platform's native instruction set.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein, and other similar standards and protocols not mentioned herein, are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A system, comprising:
   a network interface to a network;
   a processor configured with machine-readable instructions maintained in a non-transitory storage;
   a camera; and
   a display presenting information to a user of the system, wherein the information comprises sensitive information;
   wherein the processor comprises a neural network trained to recognize an image of a non-compliant environment by presenting a visual notification or an audible notification, wherein the processor receives a camera image from the camera and performs determining that the camera image comprises an image of a non-compliant environment, and wherein operation of the system cannot disable the determination that the camera image comprises the image of the non-compliant environment; and
   wherein the processor, upon determining that the camera image does comprise the image of the non-compliant environment, executes a non-compliance response, comprising omitting presentation of the sensitive information by the display.

2. The system of claim 1, wherein determining whether the camera image comprises the image of the non-compliant environment further comprises a neural network trained to recognize non-compliant environments from the camera image.

3. The system of claim 2, wherein training the neural network comprises:
   accessing a set of object images that indicate the non-compliant environment;
   applying one or more transformations to the set of object images, including rotating, color-altering, position translation, contrast alteration, or brightness alteration to create a modified set of object images;
   creating a first training set comprising a collected set of object images, the modified set of object images, and a set of compliant environment images;
   training the neural network in a first stage using the first training set;
   creating a second training set for a second stage of training comprising the first training set and the set of compliant environment images that are incorrectly detected as object images that indicate the non-compliant environment in the first stage of training; and
   training the neural network in the second stage of training using the second training set.

4. The system of claim 1, wherein omitting presentation of the sensitive information by the display comprises disabling the display.

5. The system of claim 1, wherein omitting presentation of the sensitive information by the display further comprises presenting at least one of a visual notification of omitting the presentation on the display or causing an audio output device to present an audible notification of omitting the presentation.

6. The system of claim 1, further comprising:
a speaker; and
wherein the processor is further configured to engage in a communication with a customer communication device and receive from a customer, via the customer communication device, sensitive information encoded as audio signals; and
wherein the processor decodes the audio signals and causes the speaker to output the sensitive information therein.

7. The system of claim 6, further comprising:
an input device to receive machine-inputs from the user; and
wherein the display comprises the sensitive information, transcribed from the speaker's output, and input by the user via the input device.

8. The system of claim 1, wherein the processor is further configured to obtain from a remote source, via the network, the sensitive information for presentation by the display.

9. The system of claim 1, wherein the image of the non-compliant environment comprises an image of at least one of a device comprising a camera, a device comprising an audio recorder, a communication device, a writing instrument, a notepad, a non-authorized person, the user engaged in note taking, or an unknown device.

10. The system of claim 1, wherein the non-compliance response further comprises disabling the system.

11. The system of claim 1, wherein the non-compliance response comprises alerting, via the network, a communication device of a supervisor.

12. The system of claim 11, wherein alerting a communication device of the supervisor further comprises automatically connecting the communication device of the supervisor, and wherein at least the camera image is provided to the communication device of the supervisor.

13. The system of claim 1, further comprising:
at least one of a memory or a storage device; and
wherein the non-compliance response comprises wiping data maintained in the at least one of the memory or the storage device.

14. A method, comprising:
presenting information on a display of a system, wherein the information comprises sensitive information;
receiving a camera image from a camera;
determining, by a process of a processor, that the camera image comprises a neural network trained to recognize an image of a non-compliant environment by presenting a visual notification or an audible notification and wherein operation of the processor cannot disable the determining that the camera image comprises the image of the non-compliant environment; and
upon determining that the camera image does comprise the image of the non-compliant environment, executing a non-compliance response, comprising omitting presentation of the sensitive information by the display.

15. The method of claim 14, wherein determining whether the camera image comprises the image of the non-compliant environment further comprises a neural network trained to recognize non-compliant environments from the camera image.

16. The method of claim 15, wherein training the neural network comprises:
accessing a set of object images that indicate the non-compliant environment;
applying one or more transformations to the set of object images, including rotating, color-altering, position translation, contrast alteration, or brightness alteration to create a modified set of object images;
creating a first training set comprising a collected set of object images, the modified set of object images, and a set of compliant environment images;
training the neural network in a first stage using the first training set;
creating a second training set for a second stage of training, comprising the first training set and the set of compliant environment images that are incorrectly detected as object images that indicate the non-compliant environment in the first stage of training; and
training the neural network in the second stage of training using the second training set.

17. The method of claim 14, wherein omitting presentation of the sensitive information by the display comprises disabling the display.

18. The method of claim 14, wherein omitting presentation of the sensitive information by the display further comprises presenting at least one of a visual notification of omitting the presentation on the display or causing an audio output device to present an audible notification of omitting the presentation.

19. The method of claim 14, further comprising:
engaging in a communication with a customer communication device and receiving, from a customer via the customer communication device, sensitive information encoded as audio signals;
decoding the audio signals; and
causing a speaker to output the sensitive information decoded from the audio signals.

20. A system, comprising:
a network interface to a network;
a processor configured with machine-readable instructions maintained in a non-transitory storage;
a microphone; and
a display presenting information to a user of the system, wherein the information comprises sensitive information;
wherein the processor comprises a neural network trained to recognize an image of a non-compliant environment by presenting a visual notification or an audible notification, wherein the processor receives a sound from the microphone and determines that the sound comprises a sound portion from a non-compliant environment and wherein operation of the system cannot disable the determination that the sound comprises the sound portion from the non-compliant environment; and
upon determining that the sound portion does comprise sound from the noncompliant environment, the processor performs executing a non-compliance response, comprising omitting presentation of the sensitive information by the display.

* * * * *

UNITED STATES PATENT AND TRADEMARK OFFICE
CERTIFICATE OF CORRECTION

| | | |
|---|---|---|
| PATENT NO. | : 11,868,493 B2 | Page 1 of 1 |
| APPLICATION NO. | : 17/012897 | |
| DATED | : January 9, 2024 | |
| INVENTOR(S) | : John A. Young, Harsh V. Mendiratta and David Chavez | |

It is certified that error appears in the above-identified patent and that said Letters Patent is hereby corrected as shown below:

In the Claims

At Column 18, Line 60, please delete "noncompliant" and insert --non-compliant-- therein.

Signed and Sealed this
Second Day of July, 2024

Katherine Kelly Vidal
*Director of the United States Patent and Trademark Office*